United States Patent [19]

Hutton

[11] Patent Number: 4,782,512
[45] Date of Patent: Nov. 1, 1988

[54] INTERFACING DATA UNITS TO A TELEPHONE LINE

[75] Inventor: Adrian P. Hutton, Ipswich, England

[73] Assignee: British Telecommunications, plc, London, England

[21] Appl. No.: 941,327

[22] Filed: Dec. 15, 1986

[30] Foreign Application Priority Data

Dec. 16, 1985 [GB] United Kingdom ............... 8530916

[51] Int. Cl.[4] .......................................... H04M 11/00
[52] U.S. Cl. ....................................... 379/98; 379/93; 379/355
[58] Field of Search ................... 379/93, 97, 98, 184, 379/199, 355, 361, 362, 28

[56] References Cited

U.S. PATENT DOCUMENTS

| | | | |
|---|---|---|---|
| 3,818,449 | 6/1974 | Epstein | 379/98 X |
| 4,125,872 | 11/1978 | Maxwell . | |
| 4,130,736 | 12/1978 | DeMarco et al. | 379/97 X |
| 4,219,700 | 8/1980 | Ponizzon et al. | 379/184 |
| 4,332,985 | 6/1982 | Samuel | 379/355 X |
| 4,482,786 | 11/1984 | Flynn, Jr. | 379/355 X |
| 4,485,274 | 11/1984 | Jordon et al. | 379/355 X |
| 4,513,175 | 4/1985 | Smith | 379/355 |
| 4,645,879 | 2/1987 | Simmons | 379/355 |
| 4,654,869 | 3/1987 | Smith et al. | 379/93 X |

OTHER PUBLICATIONS

Bell Laboratories Record, vol. 54, No. 11 of Dec. 11, 1976.

Primary Examiner—Keith E. George
Attorney, Agent, or Firm—Nixon & Vanderhye

[57] ABSTRACT

The present invention provides an apparatus for selectively connecting one of a plurality of data units (21,22,23) (for example modems) to a telephone line (20). The apparatus comprises a plurality of interface circuits (24) each having a respective data unit connected thereto. Also connected to each interface unit, and thereby connecting the interface units together, is a common dialing device (28), a telephone line, a dial request bus and a line occupied bus. Each interface circuit has a dial connect switch and a line connect switch, a first switching means for connecting the telephone line to the common dialing device, on operation of the dial connect switch, and a second switching means for disconnecting the telephone line from the common dialing device and connecting the telephone line to a data unit on operation of the line connect switch. The interface circuit also includes processing means for supplying a dial request signal to the dial request bus, when the common dialing device is connected to the telephone line, and for supplying a line occupied signal to the line occupied bus when its respective data unit is connected to the telephone line.

17 Claims, 4 Drawing Sheets

INTERFACING DATA UNITS TO A TELEPHONE LINE

BACKGROUND OF THE INVENTION

The present invention relates to connecting a data unit, for example a modem, to a switched telephone network and in particular to an apparatus which facilitates the selection of one from a plurality of modems for connection to said network.

Systems in which one of a plurality of modems may be connected to a telephone line are known, for example as shown in Bell Laboratories Record, Volume 54, No 11 of 11 December 1976. A system is disclosed in which the normal mode of operation is via private circuits and the telephone line provides a back-up facility. The modems are connected via a central switching matrix and a suitably sized matrix must be provided for each specific configuration.

The use of a common dialing device is shown in U.S. Pat. No. 4,125,872 of Maxwell. However in this arrangement each modem has a dedicated telephone line therefore the problem of switching the line between modems does not arise.

SUMMARY OF THE INVENTION

The present invention provides an apparatus for selectively connecting one of a plurality of data units (for example modems) to a telephone line (20). The apparatus comprises a plurality of interface circuits each having a respective data unit connected thereto. Also connected to each interface unit, and thereby connecting the interface units together, is a common dialing device, a telephone line, a dial request bus and a line occupied bus. Each interface circuit has a dial connect switch and a line connect switch, a first switching means for connecting the telephone line to the common dialing device, on operation of the dial connect switch, and a second switching means for disconnecting the telephone line from the common dialing device and connecting the telephone line to a data unit on operation of the line connect switch. The interface circuit also includes processing means for supplying a dial request signal to the dial request bus, when the common dialing device is connected to the telephone line, and for supplying a line occupied signal to the line occupied bus when its respective data unit is connected to the telephone line.

DESCRIPTION OF THE PREFERRED EMBODIMENTS

Figure 1:
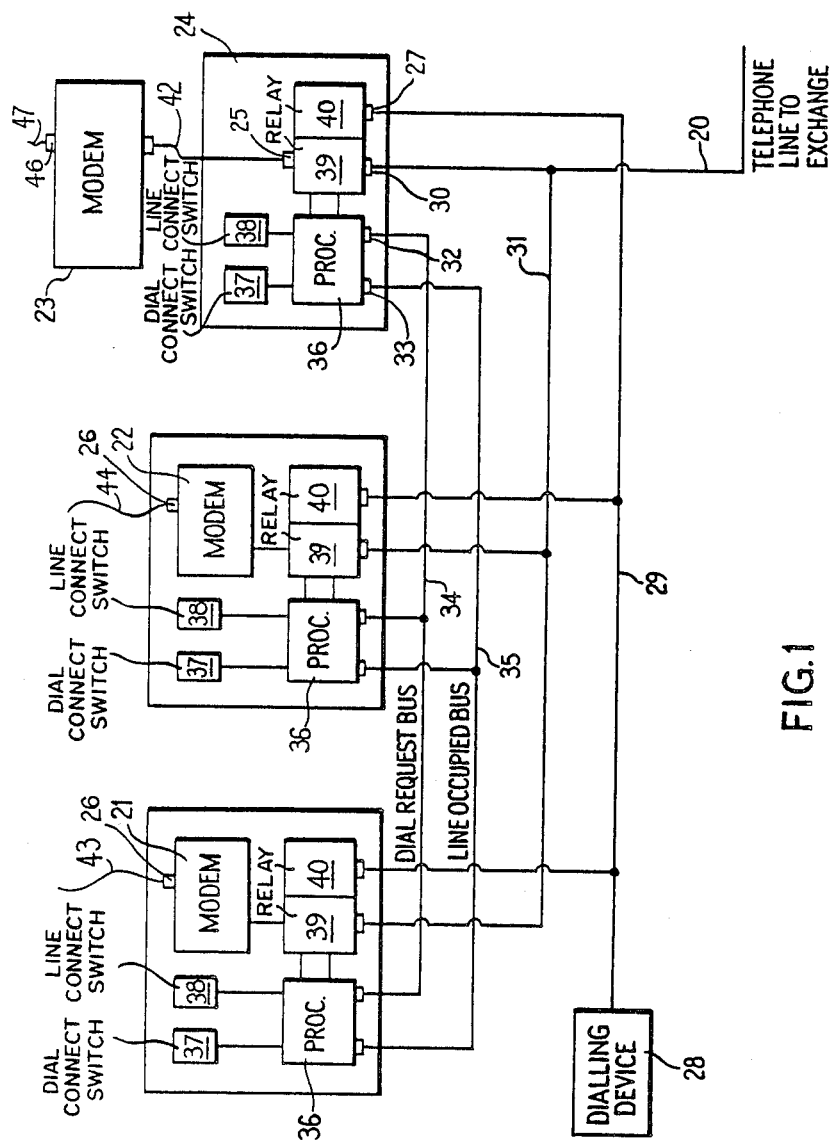
FIG. 1 shows three interface circuits which include switching devices for selectively connecting a respective data unit to a shared telephone line.

An arrangement for allowing one of three modems, or other similar data unit such as a facsimile machine, to access a shared telephone line 20 is shown in FIG. 1. A first modem 21 and a second modem 22 are fabricated on the same board as their associated interface circuit. A third modem 23 is on a separate board from its interface circuit 24. The third interface board 24 is provided with a data port 25 for connection via link 42 to its associated modem 23, which has another port 46 for connection via link 47 to a computer or similar device (not shown). The first and second boards are provided with similar ports 26 for connection via links 43 and 44 to a computer or similar device (not shown).

Each interface circuit includes a dial port 27, which is connected to a common dialing device 28 via a dial bus 29, and a line port 30 which is connected to the telephone line 20 via a line bus 31. Each interface circuit also includes a dial request port 32 and a line occupied port 33. The dial request ports 32 are each connected to dial request bus 34 so that a dial request signal generated by one interface circuit is supplied to all the other interface circuits. Similarly the line occupied ports are mutually connected by a line occupied bus 35.

The interface circuits have a programmable microprocessor 36, a dial connect switch 37, a line connect switch 38, a first switching device 39 and a second switching device 40. The switching devices 39,40 are two pole relay devices and are shown in greater detail in FIG. 2.

Figure 2:
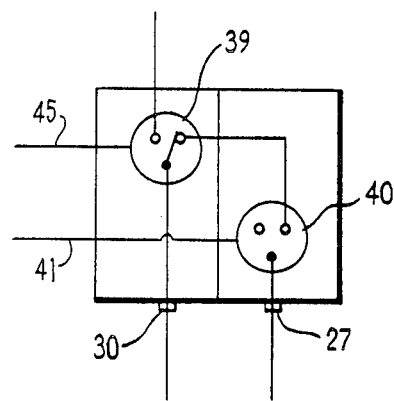
FIG. 2 details the switching devices of FIG. 1.

The operation of the apparatus will now be described with reference to FIGS. 1 and 2. The procedure is to operate a dial connect switch 37 of a selected interface circuit, operate the dialing device to obtain a connection and then operate the line connect switch 38 of the interface circuit. When a modem, say modem 21, is connected to the telephone line then the processor 36 of its associated interface circuit generates a continuous signal on the line occupied bus. When modem 21 terminates its call this signal is removed by activating the dial connect switch 37 of its associated interface circuit or in response to data from the telephone line 20 or the data unit.

On operating a dial connect switch connection is prevented if a signal is present on the line occupied bus 35 indicating that the shared telephone line is in use. If the line is not in use then relay 40 is switched to the right in response to a switching control signal on line 41 to the position shown in FIG. 2 in the selected interface circuit and an output pulse is supplied to the dial request bus 34. This pulse is supplied to the other interface circuits and their respective processors 36 ensuring that their relays 40 are switched to the left. On operating the line connect switch 38, after operating the dialing device, the processor of the selected interface switches relay 39 via a control signal on line 45 to the left, which connects the modem to the telephone line, and supplies a line occupied signal to the line occupied bus.

Figure 4:
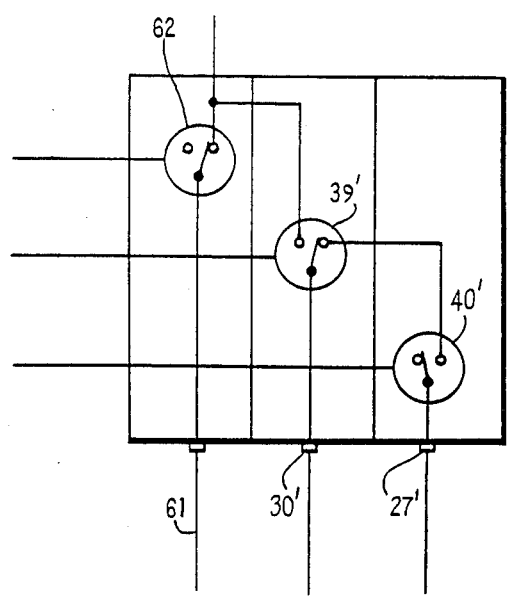
FIG. 4 details the switching devices of FIG. 3.
Figure 3:
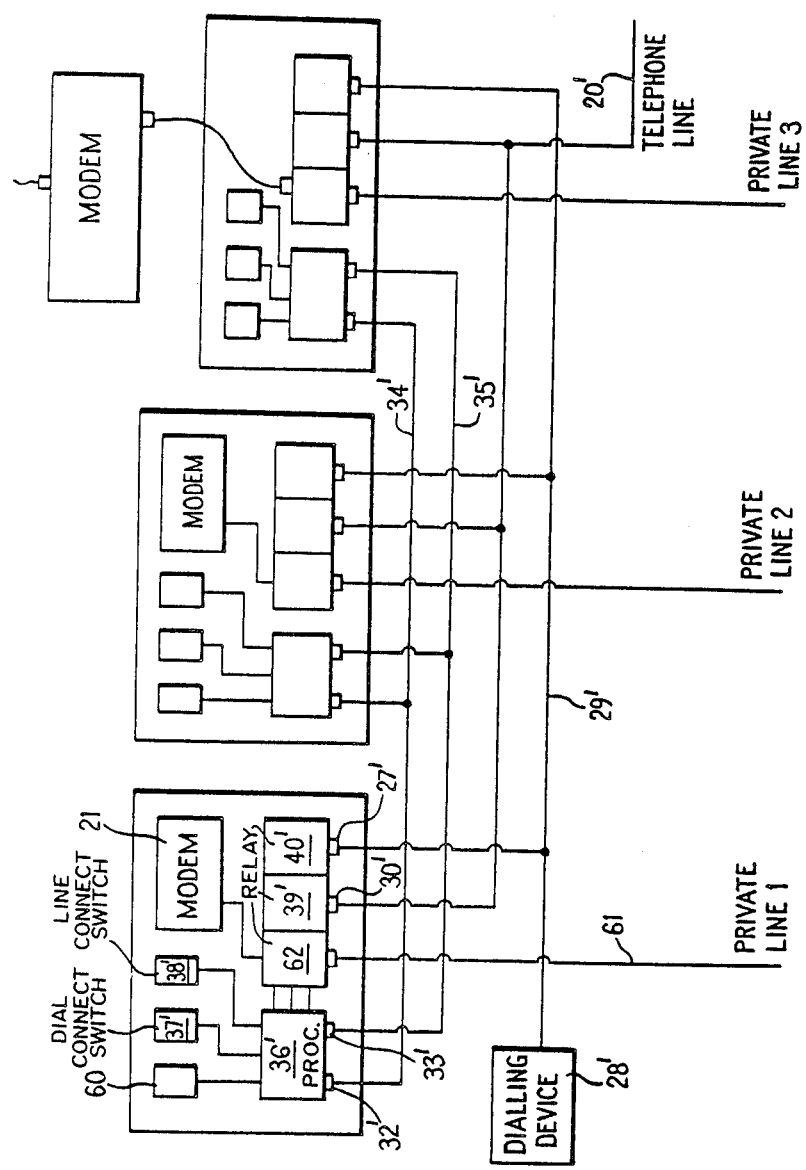
FIG. 3 shows three interface circuits which include switching devices for connecting a respective data unit to a respective private circuit or to a shared telephone line.

A similar arrangement is shown in FIG. 3 in which the components similar to those in FIG. 1 are given the same reference number followed by a prime. Each interface circuit may connect its data unit to a dedicated private circuit. However if a private circuit is out of service then the interface circuit may also access a shared telephone line 20'. Operation of a private line connect switch 60 provides a connection to a private line 61. In response to activating switch 60 the processor activates a relay 62 to the right (FIG. 4) and relay 39' is activated to the right. The operation of switches 37' and 38', to connect a modem to the telephone line 20', is the same as detailed above.

Figure 5:
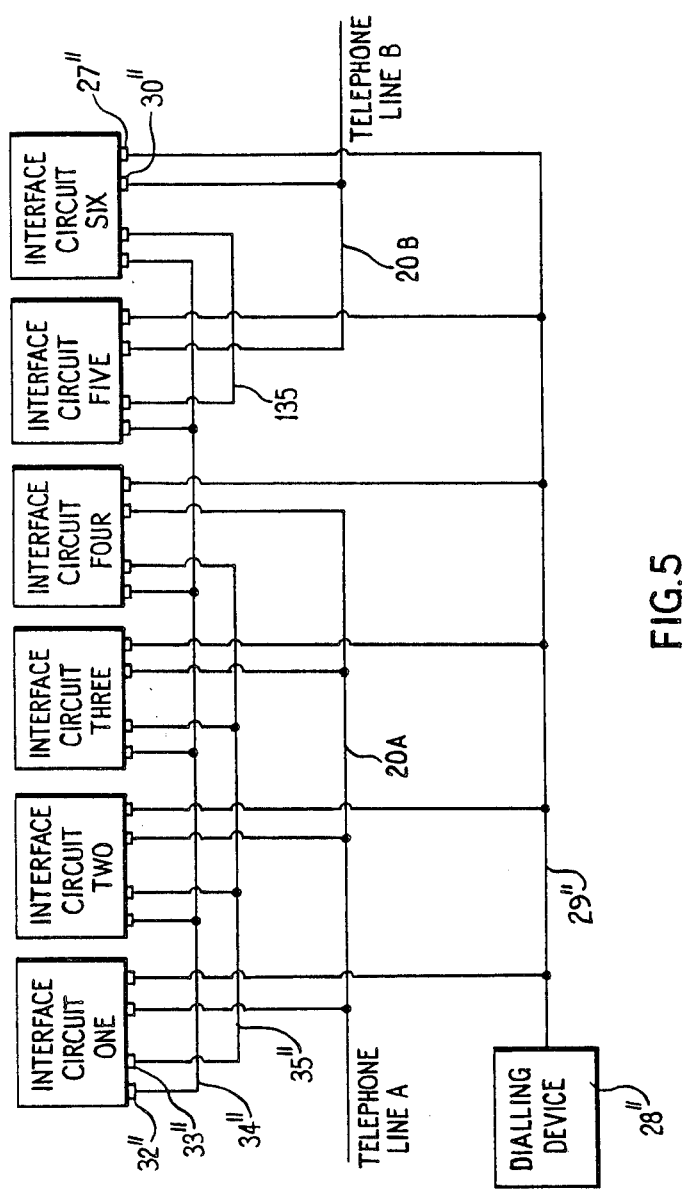
FIG. 5 shows four interface circuits sharing a first telephone line, another two interface circuits sharing a second telephone line and a single common dialing device connected to all six interface circuits.

Any number of interface circuits may be connected together without requiring any additional hardware. In addition the interface circuits may be connected to more than one telephone line in which case they are divided into sets as shown in FIG. 5. The interface circuits, each with their associated modem, are mounted in a rack. The dial request bus 34" and the line occupied bus 35" are in the form of links which connect adjacent boards and said links may be removed to provide sets of interface circuits.

In FIG. 5 a first set of four interface circuits are connected to a telephone line 20A and a second set of two interface circuits are connected to a second telephone line 20B via their line ports 30". The dial ports 27" of all the interface circuits are connected to a common dialing device 28" via a bus 29". The dial request ports 32" of first set and the dial request ports 32" of the second set are mutually connected by a dial request bus 34". Similarly separate line occupied buses 35" and 135 are provided for the first and second set respectively which are connected to the line occupied ports 33". It can therefore be seen that any combination of telephone lines and data units can be configured without requiring additional equipment.

What we claim is:

1. An apparatus for selectively connecting one of a plurality of data units to a telephone line, comprising a plurality of interface circuits, each of which is connected in use to a respective data unit, a common dialing device connected to each interface circuit; the telephone line being connected to each interface circuit; a dial request bus connected to each interface circuit; and a line occupied bus connected to each interface circuit; each interface circuit comprising a manually-operable dial connect switch, a manually-operable line connect switch, a first switching means for connecting the telephone line to the common dialing device on operation of the dial connect switch, a second switching means for disconnecting the telephone line from the common dialing device and connecting the telephone line to its respective data unit on operation of the line connect switch, and processing means arranged to supply a dial request signal to the dial request bus, when the common dialing device is connected to the telephone line, and to supply a line occupied signal to the line occupied bus when its respective data unit is connected to the telephone line.

2. An apparatus according to claim 1 in which the processing means of each interface circuit is arranged to receive dial request signals and line occupied signals wherein an interface circuit is isolated from the common dialing device on receiving a dial request signal and the interface circuit is prevented from accessing the telephone line on receiving a line occupied signal.

3. An apparatus according to claim 2 in which the dial request signal is a single pulse.

4. An apparatus according to claim 2 in which an interface circuit generates a continuous line occupied signal when its data unit is connected to the telephone line.

5. An apparatus according to claim 4 in which an interface circuit may be connected to the telephone line only when a line occupied signal is not being supplied to the line occupied bus by another interface circuit.

6. An apparatus according to claim 4 in which a line occupied signal generated by a first interface circuit is removed by the operation of its respective dial connect switch.

7. An apparatus according to claim 4 in which a line occupied signal is removed by the processing means in response to data from at least one of the data unit and the telephone line representing an end of transmission.

8. An apparatus according to claim 1 in which the interface circuit includes a third switching means for connecting the data unit to a private circuit wherein the telephone line provides a back up facility.

9. An apparatus according to claim 1 further comprising a plurality of telephone lines each connected to a respective plurality of interface units and wherein
each said respective plurality of interface units is connected to a respective independent line occupied bus.

10. An interface circuit for connecting a data unit to a switched telephone network, comprising a data port for connection to the data unit; a dial port for connection to a common dialing device; a line port for connection to a telephone line; a dial request port for connection to a dial request bus; a line occupied port for connection to a line occupied bus; a dial connect switch; a line connect switch; a first switching means for selectively connecting the line port to the dial port on operation of the dial connect switch; a second switching means for disconnecting the line port from the dial port and connecting the line port to the data port on operation of the line connect switch; and processing means arranged to supply a dial request signal to the dial request port, when the dial port is connected to the line port, and to supply a line occupied signal to the line occupied port when the data port is connected to the line port.

11. An interface circuit according to claim 10 in which the processing means is a programmable microprocessor arranged to receive dial request signals from the dial request port and to receive line occupied signals from the line occupied port.

12. An interface circuit according to claim 11 in which the microprocessor prevents the first switching means from connecting the dial port to the line port when a line occupied signal is supplied to the line occupied port.

13. An interface circuit according to claim 11 in which the microprocessor prevents the second switching means from connecting the data port to the line port when a line occupied signal is supplied to the line occupied port.

14. An interface circuit according to claim 10 including a private circuit port, a private circuit switch and a third switching means in which the third switching means connects the data port to the private circuit port on operation of the private circuit switch.

15. An interface circuit according to claim 10 mounted on a board in which the data unit is a modem mounted on said board.

16. An interface circuit according to claim 10 in which the board is mounted on a rack and the dial request port and the line occupied port are connected to similar ports of a similar interface circuit mounted in said rack.

17. An interface circuit according to claim 10 in which the first switching means and the second switching means are two pole relays operated in response to signals from the processing means.

* * * * *